United States Patent [19]
Sisk

[11] 4,074,560
[45] Feb. 21, 1978

[54] APPARATUS AND METHOD FOR SIZING STATOR BORES

[76] Inventor: Hollis D. Sisk, 329 Ridge Meadow, Chesterfield, Mo. 63017

[21] Appl. No.: 744,443

[22] Filed: Nov. 22, 1976

[51] Int. Cl.² ............................................ B21D 41/02
[52] U.S. Cl. .................................................. 72/393
[58] Field of Search ................................. 72/392, 393

[56] References Cited
U.S. PATENT DOCUMENTS

| | | | |
|---|---|---|---|
| 3,466,920 | 9/1969 | Parker | 72/393 |
| 3,762,041 | 10/1973 | Bair | 72/393 |
| 3,834,013 | 9/1974 | Gerstle | 29/609 |
| 4,020,878 | 5/1977 | Yashiro | 140/88 |

Primary Examiner—Lowell A. Larson
Attorney, Agent, or Firm—James R. Bell

[57] ABSTRACT

This invention describes a relatively undersized radially expandible sleeve member which can be easily inserted through a bore formed in a stator core. A relatively oversized plug member is then forced through the sleeve thus radially expanding the sleeve and urging the sleeve radially outwardly into engagement with the bore.

3 Claims, 2 Drawing Figures

APPARATUS AND METHOD FOR SIZING STATOR BORES

BACKGROUND OF THE INVENTION

1. Field Of The Invention

This invention relates generally to metal working and more particularly to processes of mechanical manufacture for electrical devices such as dynamo-electric machines.

2. Description Of The Prior Art

During the manufacture of electric motors, stator cores are preassembled. These cores generally comprise a stack of laminations which are usually individually punched from coil stock. The stock material is generally referred to as a magnetic type of electrical steel.

Such stator cores are annealed for the purpose of developing a larger grain size and thus optimizing the magnetic properties of the core material. Sometimes the individual laminations are separately annealed and other times a core is fabricated into a stack of laminations and then annealed as a unit.

Another purpose of the annealing process is for forming an iron oxide scale on the surface of each lamination resulting in desirable inter-lamination resistance properties, that is, eddy current losses between laminations are limited.

Physically, stator cores are of various outside configurations, for example, round, square, rectangular or similar shapes. A circular stator bore is formed in each lamination regardless of the outside configuration of the core. Thus, when the laminations are stacked and the bores aligned, a cylindrical bore is formed in the core. Also, coil slots are formed in each lamination in circular disposition about the circumference of the bore. A portion of each slot actually intersects the bore. Slot depth varies to give a desired flux density characteristic in the core. Between adjacent slots is a portion of the lamination which forms the inside diameter of the bore. These portions are called stator teeth and they transmit the desired flux from the stator core to the rotor which rotates within the bore when the motor is assembled. Since the rotor rotates in proximity to the stator bore, there being only a slight air gap between the outside diameter of the rotor and the inside diameter of the bore, uniformity in the bore circumference is critical.

When laminations are stacked to form the fabricated stator core, several factors contribute to the lack of uniformity in the circumference of the stator bore. Contributing to these factors are, for example:

1. non-uniform stresses in the coil steel;
2. relief of these stresses when the laminations are punched;
3. distortion created during the annealing process;
4. irregularities due to staggered laminations; and
5. welding stresses distorting the core if laminations are welded to form a unit.

To provide the critical uniformity to the bores or to size the bores as it is referred to, various techniques have been used. Some of these techniques are as follows:

1. hand filing the inner circumference of the bore;
2. hand grinding the bore;
3. machining the bore with a cutting tool;
4. honing;
5. broaching; and
6. roller burnishing.

Also, an oversized plug is sometimes forced directly into the bore resulting in direct contact between the plug and the bore as the plug forcibly shaves the inner circumference of the bore.

While these techniques do improve the uniformity of the bore circumference they create other undesirable problems in the core such as undesirable stresses created in the tips of the stator teeth which cause hysteresis losses in the stator material and such as shorting laminations at the bore circumference which destroys the desirable interlamination resistance created by the iron oxide scale. These problems can all be based on the fact that the above-described techniques used to improve bore circumference uniformity have a single common denominator. That denominator involves direct forcible contact between a moving member and the bore circumference.

It would be desirable to have a device or method capable of providing the desired uniformity of the bore circumference without involving the undesirable characteristics of presently known techniques.

SUMMARY OF THE INVENTION

Accordingly, the present invention provides a device and a method capable of creating bore circumference uniformity without imposing the undesirable characteristics of prior art techniques. The foregoing is accomplished by providing a relatively undersized radially expandable sleeve member which can be easily inserted through a stator bore. A relatively oversized plug member is then forced through the sleeve thus radially expanding the sleeve and urging the sleeve radially outwardly into engagement with the bore thus avoiding direct forcible contact between a moving member and the bore circumference.

Other advantages and novel features of this invention will become apparent from the following detailed description of the invention when considered in conjunction with the accompanying drawings. It is to be expressly understood, however, that the drawings are not intended as a definition of the invention but for the purpose of illustration only.

BRIEF DESCRIPTION OF THE DRAWINGS

In the drawings wherein like parts are marked alike.

DESCRIPTION OF THE PREFERRED EMBODIMENT

Figure 2:
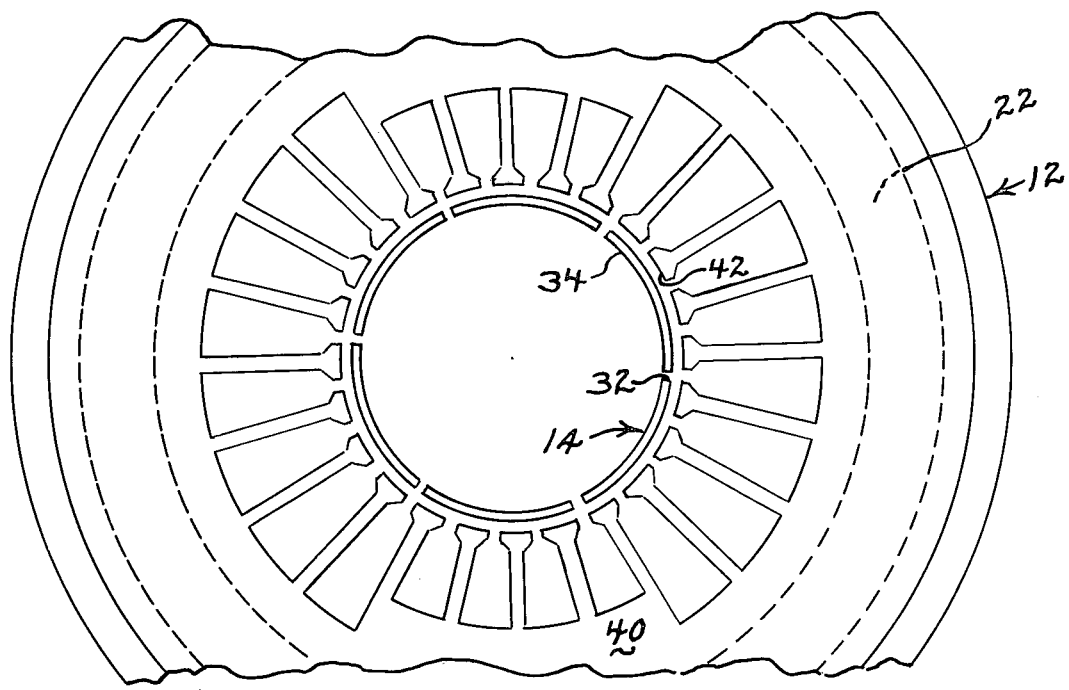
FIG. 2 illustrates a partial plan view of the apparatus of this invention.
Figure 1:
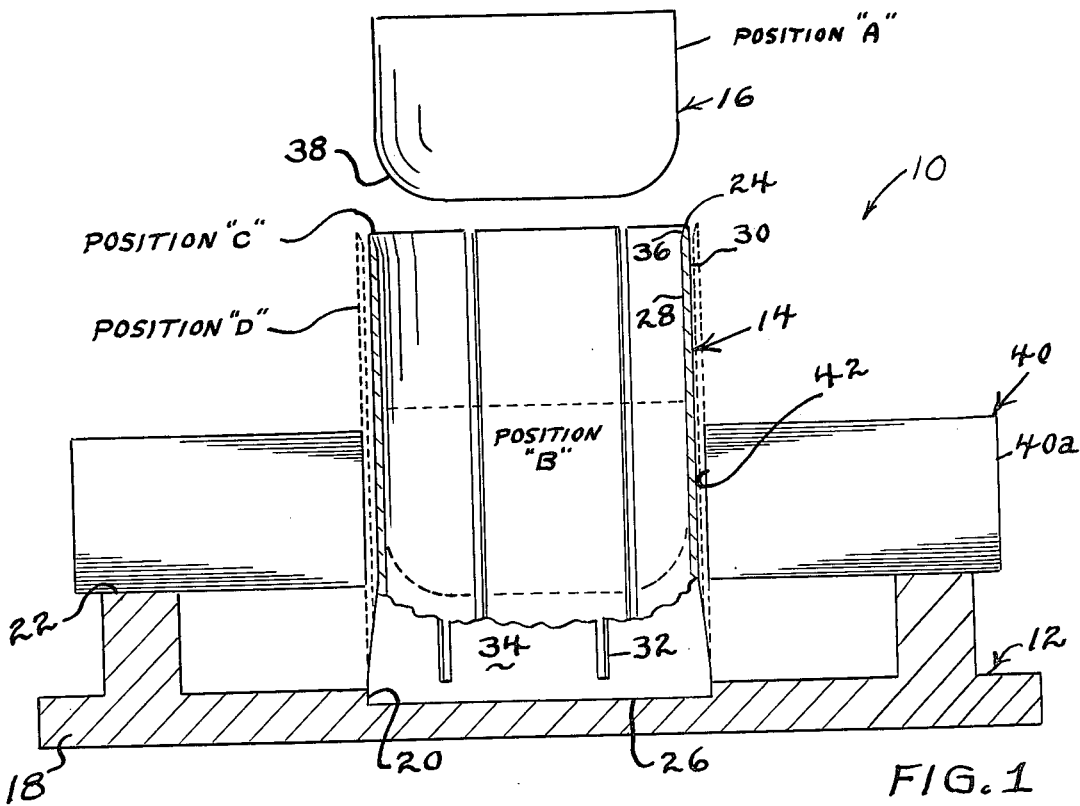
FIG. 1 illustrates a cross-sectional side elevational view of the novel apparatus of this invention.

Referring now to the drawings, FIG. 1 illustrates a stator bore sizing apparatus generally designated 10 including a support member 12, a radially expandable sleeve member 14 carried by support 12 and a sizing plug 16. A stator core 40 comprising a stack of individual laminations 40a, can be positioned on support member 12.

Support Member

Support member 12 is preferably of steel but may be of any suitable material. The support member may include a substantially planar portion 18 having a blind bore 20 formed therein. A platform 22 is formed on planar portion 18 and comprises a land in raised relationship with the planar portion. In this manner, when stator core 40 is positioned on platform 22, the core is displaced from planar portion 18. The geometric requirements of support 12 are generally not critical except that bore 20 must be circular in cross-section to accommodate sleeve 14.

Sleeve

Sleeve 14 is radially expandable tubular member of circular cross-section having a first end 24 and a second end 26. Also, sleeve 14 includes an inner peripheral surface 28 and an outer peripheral surface 30. Outer surface 30 has a diameter less than the diameter of bore 42 formed in stator core 40. Thus, outer periphery 30 of sleeve 14 is undersized relative to bore 42. In this manner, bore 42 and outer surface 30 have a substantially loose-fitting relationship when sleeve 14 is positioned inside bore 42.

Continuous slots 32 are formed along the length of sleeve 14 for axially segmenting the sleeve into segments 34. Slots 32 extend from first end 24 and terminate just before reaching second end 26. In this manner, sleeve 14 becomes radially expandable. Second end 26 is carried by bore 20 of support member 12. Sleeve 14 is preferably of steel although it is contemplated that other suitable materials may suffice. Inner periphery 28 preferably includes tapers 36 or is beveled at first end 24.

Plug

Plug 16 is preferably a solid metal cylindrical member or could be a sphere. Regardless, plug 16 includes a circular cross-section and a tapered, rounded or beveled portion 38 to engage taper 36 thus facilitating insertion of plug 16 into first end 24 of sleeve 14. Plug 16 has its largest diameter larger than the diameter of inner peripheral surface 28. Thus, plug 16 is oversized relative to inner periphery 28 of sleeve 14. In this manner the plug and the inner periphery have an interference-fitting relationship, but the relationship is such as to permit plug 16 to be forced into and through sleeve 14.

Operation

In operation, with sleeve second end 26 carried by bore 20 of support 12 and stator core 40 positioned on platform 22, outer periphery 30 of sleeve 14 extends through bore 42 in loose-fitting relationship therewith. Plug 16, position "A" is then forced into first end 24 of sleeve 14 and moved substantially along inner periphery 28, as illustrated by position "B" in phantom outline, thus radially separating segments 34 expanding sleeve 14 from position "C" to position "D" as illustrated in phantom outline. In this manner, sleeve outer periphery 30 expands outwardly into engagement with bore 42.

The foregoing has described an apparatus and method capable of providing the desired uniformity to stator bore circumference by forcing a relatively oversized plug through a relatively undersized radially expandable sleeve.

Other modifications and variations of the present invention are possible in the light of the above teachings. It is therefore to be understood that within the scope of the appended claims the invention may be practiced otherwise than as specifically described.

What is claimed is:

1. Apparatus for sizing stator bores for electric motors comprising:
   a support member;
   an elongated tubular sleeve member carried by the support member extending through and entirely along the length of a bore formed in a stator core, the sleeve comprising a first elongated portion having a first diameter including a plurality of elongated segments extending substantially along the length of the sleeve member terminating at a second portion having a second diameter greater than the first diameter; and
   sizing plug means for insertion substantially through the sleeve member in interference-fitting relationship with the elongated segments for radially expanding the first portion of the sleeve member outwardly toward the second diameter of the second portion for forming a substantially constant diameter sleeve member along the entire length of the bore.

2. The apparatus of claim 1, wherein:
   the segments are formed by a plurality of elongated slots which extend from a first sleeve end displaced from the support member and terminate adjacent a second sleeve end carried by the support member.

3. The apparatus of claim 2, and further including:
   platform means carried by the support member for supporting the stator core thereon displaced from the second sleeve end.

* * * * *